(12) United States Patent
Barquist

(10) Patent No.: US 8,997,322 B1
(45) Date of Patent: Apr. 7, 2015

(54) COMPACT AND PORTABLE HYDRAULIC EXTRACTING AND INSTALLING APPARATUS AND ASSOCIATED METHOD

(76) Inventor: Carl Barquist, Jacksonville, FL (US)

( * ) Notice: Subject to any disclaimer, the term of this patent is extended or adjusted under 35 U.S.C. 154(b) by 490 days.

(21) Appl. No.: 13/084,508

(22) Filed: Apr. 11, 2011

Related U.S. Application Data

(60) Provisional application No. 61/322,358, filed on Apr. 9, 2010.

(51) Int. Cl.
*B23P 19/04* (2006.01)
*B23P 19/02* (2006.01)

(52) U.S. Cl.
CPC ....................................... *B23P 19/02* (2013.01)

(58) Field of Classification Search
USPC ........... 29/426.3, 700, 244, 283, 239; 294/88, 294/202, 192, 197, 198, 103.1, 119.1, 92, 294/207
See application file for complete search history.

(56) References Cited

U.S. PATENT DOCUMENTS

| 4,728,137 | A | * | 3/1988 | Hamed et al. | 294/202 |
| 5,884,952 | A | * | 3/1999 | Chadwick | 294/202 |
| 7,052,060 | B2 | * | 5/2006 | Vigholm et al. | 294/198 |

* cited by examiner

*Primary Examiner* — Ryan J Walters

(57) ABSTRACT

A compact and portable hydraulic apparatus for extracting and installing a tight fitting vehicle component may include a main hydraulic cylinder having an open proximal end, a cover attached to the open proximal end of the main hydraulic cylinder, a grip holder attached to the main hydraulic cylinder, a plurality of grip members affixed to the grip holder and spaced from the main hydraulic cylinder, and an actuating member statically mated to the main hydraulic cylinder. In this manner, the actuating member is capable of being engaged with an existing shaft of an existing pulley. Advantageously, the actuating member is axially reciprocated through the open proximal end of the main hydraulic cylinder, relative to a stationary position of the grip holder and the grip member respectively.

8 Claims, 10 Drawing Sheets

COMPACT AND PORTABLE HYDRAULIC EXTRACTING AND INSTALLING APPARATUS AND ASSOCIATED METHOD

CROSS REFERENCE TO RELATED APPLICATIONS

This application claims the benefit of U.S. Provisional Application No. 61/322,358, filed Apr. 9, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to workshop tools and, more particularly, to a compact and portable hydraulic extracting and installing apparatus for providing users with an easy and convenient means of extracting and installing tight fitting components of hydraulic pumps, pulleys and many other fluid pressure inducing devices.

2. Prior Art

Hydraulic pumps, pulleys and many fluid pressure inducing devices are typically in use in a variety of machineries and motor vehicle components. Due to their mode of operation including high speed and extreme pressure applications, the components have to be force-fitted to ensure their integrity during use. Typical assemblies may include for example a pulley, shaft and bearing assembly of a vehicle engine; or a hydraulic power steering pump having a sleeve and a shaft tightly fitted together. The present invention relates to the extraction and installation of the tight fitting male and female members of these components.

Prior art including pullers used in grasping an object secured to a shaft and pulling the object off of the shaft are well known. Typically, such pullers include a plurality of clamped jaws which are located about the object with grasping ends of the jaws engaging the object to be removed from the shaft. A central pusher element will be driven against the end of the shaft to pull the jaws and clamped object over and off of the shaft. The prior art devices used for this purpose typically includes a plurality of bolting and screw members together with clamping members to effect a push or pull action depending on the direction of the object to be extracted or installed. These devices require a high turning force to induce the pushing or pulling member to move in a direction in line with the movement of the object to be extracted or installed. A slight movement or misalignment of the tools may result in repeating the assembly process or repositioning the device and work piece, a task that may take hours and may result in damage to the delicate component(s). There is currently no compact and portable power assisted extracting and installing device readily available to the average mechanic that would allow him to remove or install the object intact in a lesser period of time.

Accordingly, a need remains for an apparatus in order to overcome the above-noted shortcomings. The present invention satisfies such a need by providing a compact and portable hydraulic extracting and installing apparatus that is convenient and easy to use, lightweight yet durable in design, versatile in its applications, and designed for extracting and installing tight fitting components of hydraulic pumps, pulleys and many fluid pressure inducing devices typically in use in a variety of machineries and motor vehicle components.

BRIEF SUMMARY OF THE INVENTION

In view of the foregoing background, it is therefore an object of the present invention to provide a compact and portable hydraulic apparatus for extracting and installing a tight fitting vehicle component, such as a pulley, for example. These and other objects, features, and advantages of the invention are provided by a portable power-actuated apparatus including a main hydraulic cylinder having an open proximal end, a cover attached to the open proximal end of the main hydraulic cylinder, a grip holder attached to the main hydraulic cylinder, a plurality of grip members affixed to the grip holder and spaced from the main hydraulic cylinder, and an actuating member statically mated to the main hydraulic cylinder. In this manner, the actuating member is capable of being engaged with an existing shaft of an existing pulley. Advantageously, the actuating member is axially reciprocated through the open proximal end of the main hydraulic cylinder, relative to a stationary position of the grip holder and the grip member respectively.

In a non-limiting exemplary embodiment, the main hydraulic cylinder may include a piston statically engaged with the actuating member and linearly reciprocated along an axial path passing through the proximal open end.

In a non-limiting exemplary embodiment, the grip holder may be statically mated to a distal end of the main hydraulic cylinder such that the cover faces away from the grip holder. Such grip members preferably extend substantially parallel to the axial path.

In a non-limiting exemplary embodiment, the grip holder may have an annular ring shape.

In a non-limiting exemplary embodiment, a puller may be removably wrapped about the cover and the open proximal end of the main hydraulic cylinder. Such a cover preferably has a groove continuously extending about an entire circumferential perimeter thereof and thereby interfitted within the puller. In this manner, the puller is capable of being interlocked with the existing pulley.

In a non-limiting exemplary embodiment, the actuating member may be an extension insert statically coupled to the piston and axially reciprocated through the proximal open end.

In a non-limiting exemplary embodiment, the actuating member may be an insert and a bolt attached thereto. Such a bolt may axially passes through the main hydraulic cylinder and exits out from the open proximal end such that the bolt is capable of being mated to the existing pulley shaft.

In a non-limiting exemplary embodiment, the grip holder may be statically affixed to the piston. Such an actuating member may be an insert and a bolt attached thereto. Such a bolt may be statically affixed to the piston such that the main hydraulic cylinder is axially displaced away from the grip holder while the piston and the grip members remain statically affixed to the grip holder respectively.

The present disclosure may further include a method of utilizing a portable power-actuated apparatus for extracting and installing a tight fitting vehicle component. Such a method may include the steps of: providing a main hydraulic cylinder having an open proximal end; providing and attaching a cover to the open proximal end of the main hydraulic cylinder; providing and attaching a grip holder to the main hydraulic cylinder; providing and affixing a plurality of grip members to the grip holder; spacing the grip members from the main hydraulic cylinder; providing and statically mating an actuating member to the main hydraulic cylinder; engaging the actuating member with an existing shaft of an existing pulley; and axially reciprocating the actuating member through the open proximal end of the main hydraulic cylinder, relative to a stationary position of the grip holder and the grip member respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
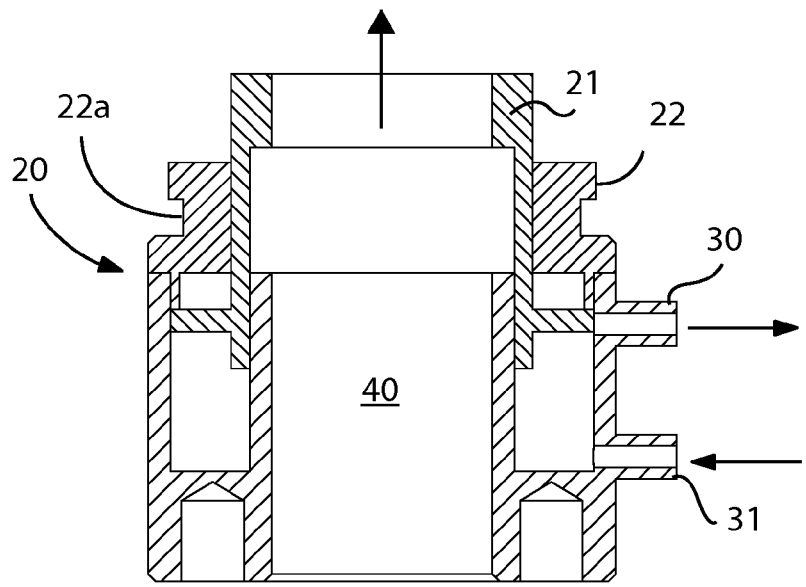
FIG. 1 is a cross-sectional view of a main hydraulic cylinder used for installing and extracting tight fit vehicle components such as a pulley, for example, with the piston at an extended position in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing

DETAILED DESCRIPTION

Figure 2:
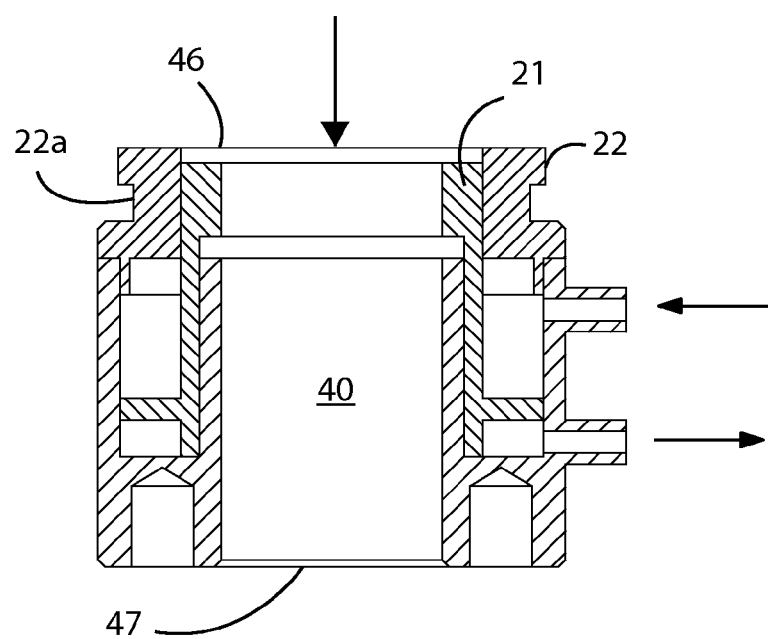
FIG. 2 is a cross-sectional view of the main hydraulic cylinder shown in FIG. 1 with the piston at a retracted position.
Figure 3:
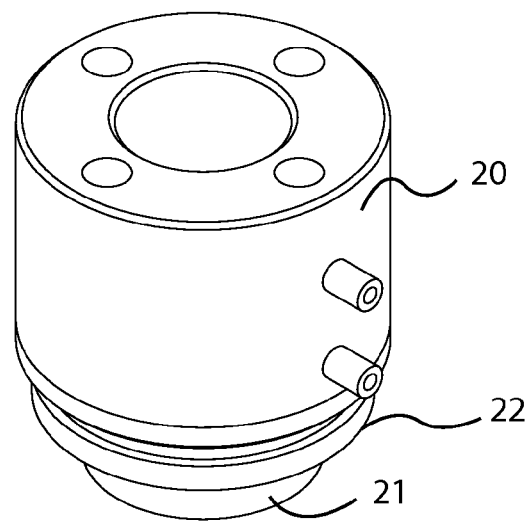
FIG. 3 is a perspective view of the main hydraulic cylinder with the grooved cover attached to an end thereof.
Figure 4:
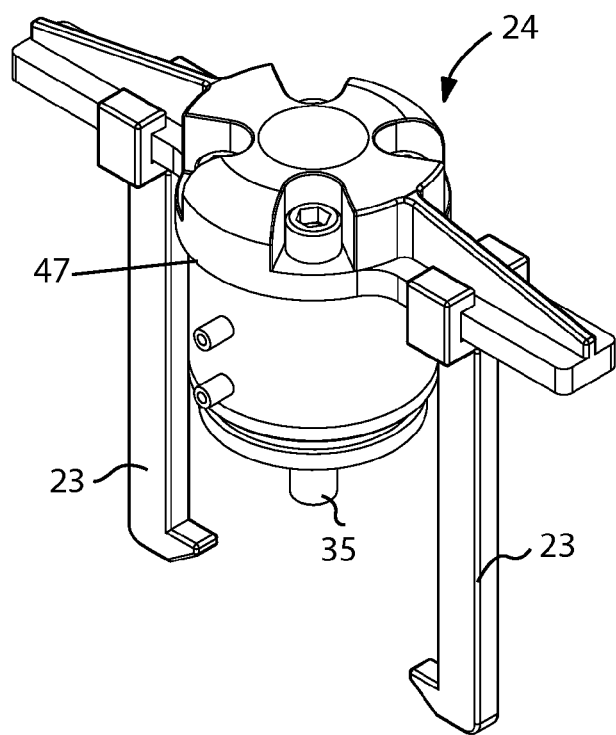
FIG. 4 is a perspective view showing an exemplary embodiment wherein a grip holder is secured to the main hydraulic cylinder with a plurality of grip members attached to the grip holder; an extension insert is attached to the piston and extends out from the cover.
Figure 5:
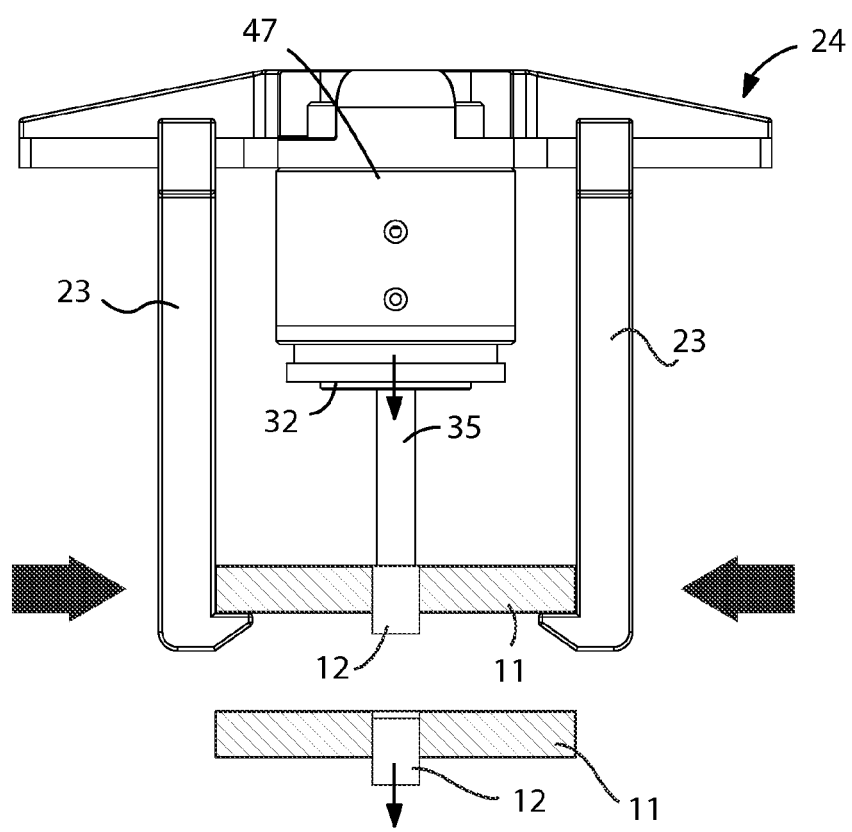
FIG. 5 is a front elevational view showing the showing the grip members maintaining a pulley at a stationary position while a shaft of the pulley is pushed outwardly and away from the pulley.
Figure 6:
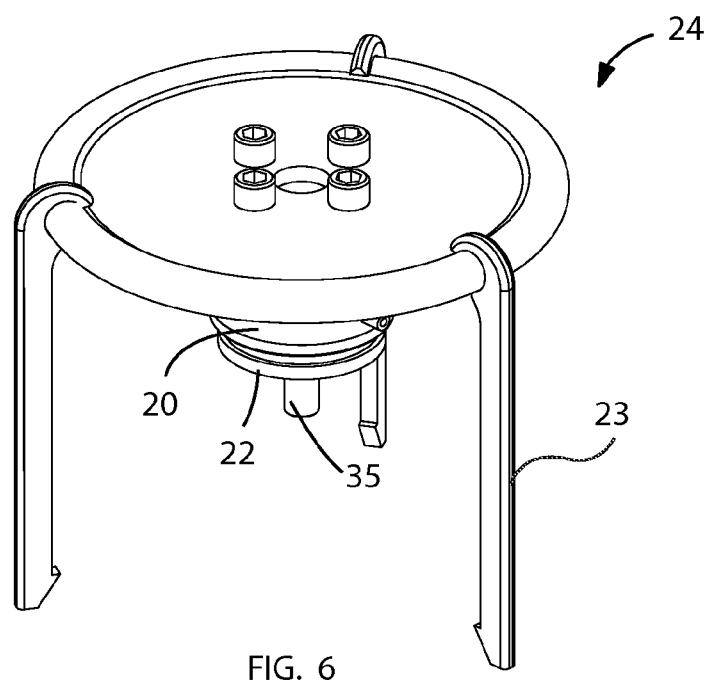
FIG. 6 is a perspective view showing an exemplary embodiment wherein the grip holder is a hub puller ring secured to the main hydraulic cylinder with a plurality of grip members attached to the grip holder; an extension insert is attached to the piston and extends out from the cover.
Figure 7:
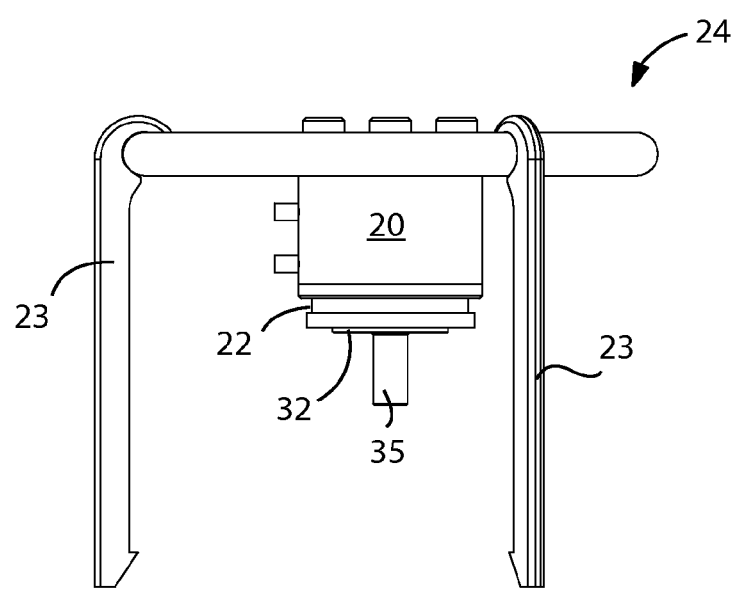
FIG. 7 is a side elevational view of the embodiment shown in FIG. 6.
Figure 8:
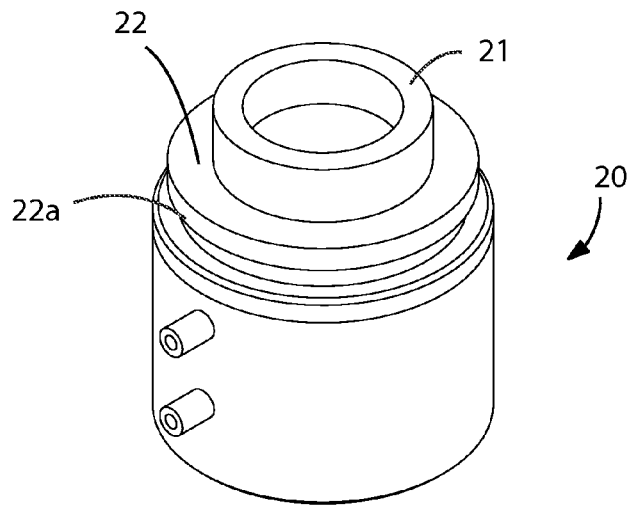
FIG. 8 is a perspective view showing a front end of the main hydraulic housing having a grooved cover attached thereto with the piston partially extended out from the grooved cover.
Figure 9:
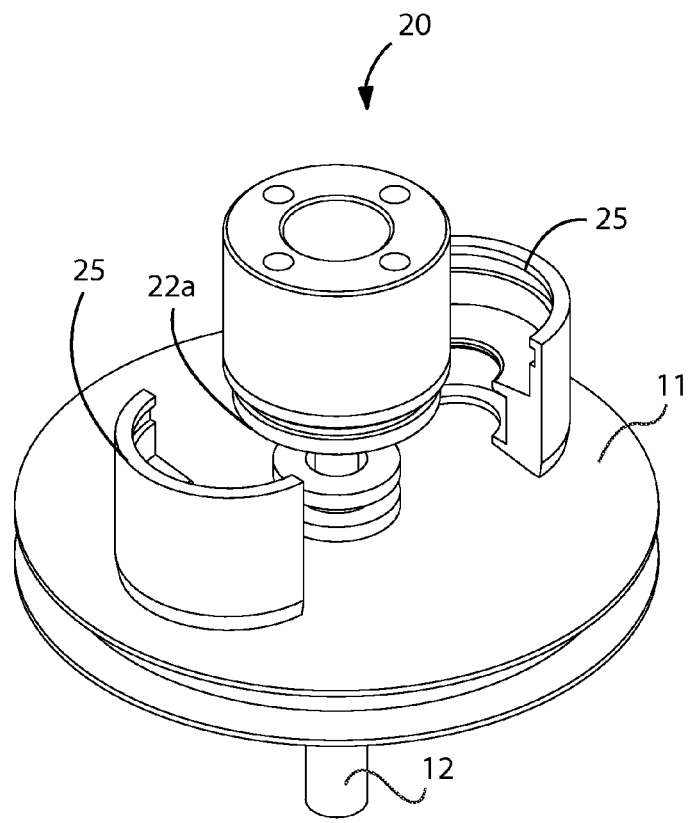
FIG. 9 is an exploded view showing the interrelationship between the main hydraulic cylinder of FIG. 8, a pulley and a puller positional about the grooved cover.
Figure 10:
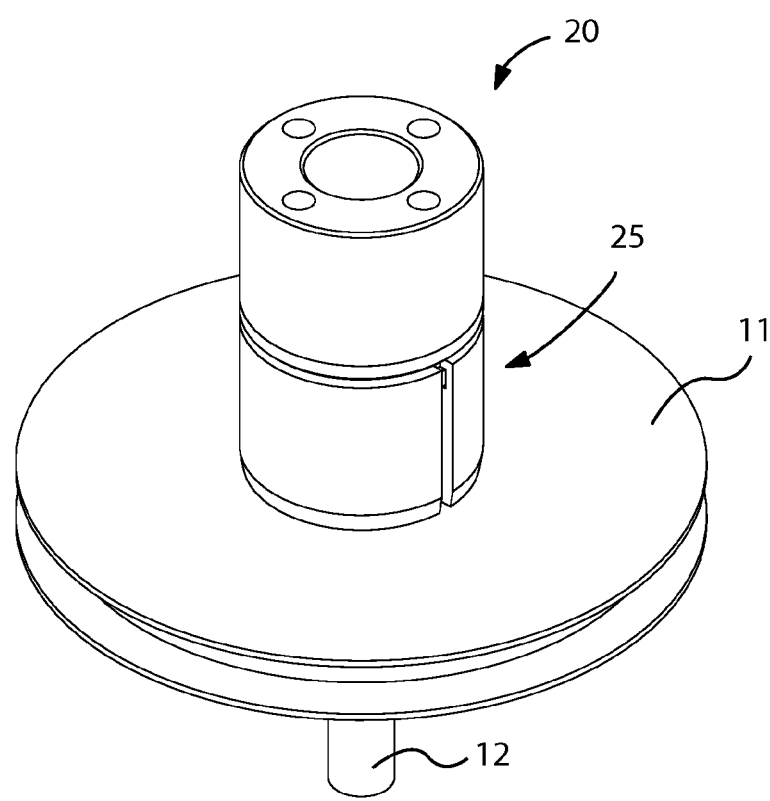
FIG. 10 is a perspective view of FIG. 9 wherein the puller is wrapped about the grooved cover and a portion of the pulley.
Figure 11:
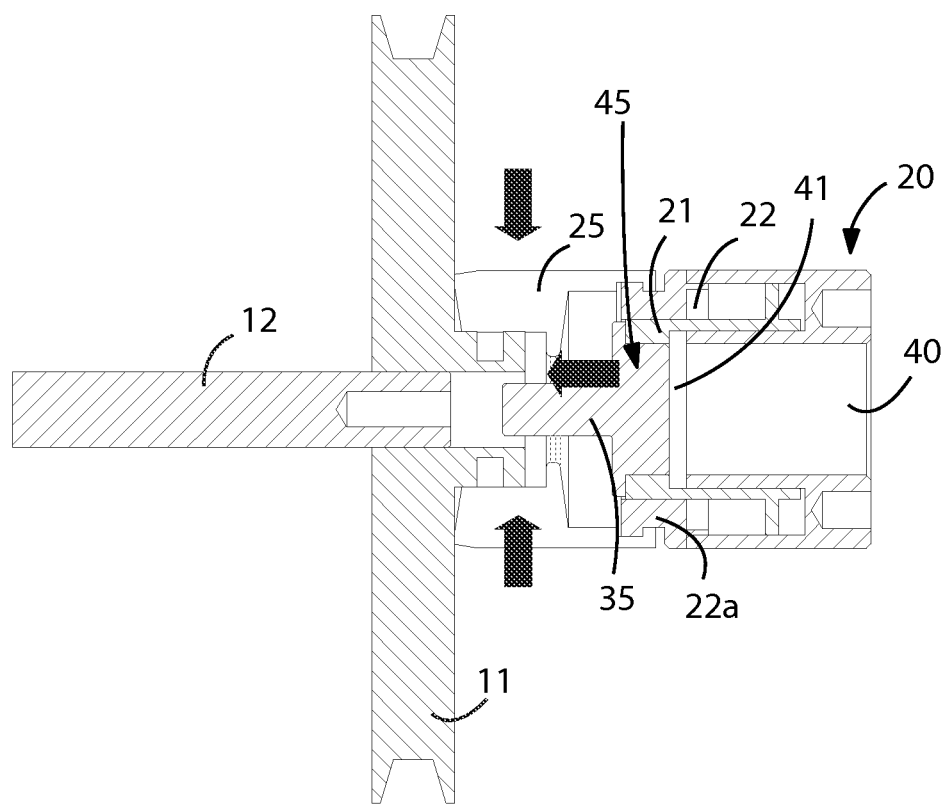
FIG. 11 is a cross-sectional view of FIG. 10 showing the pulley shaft being pushed through the pulley via an extension insert attached to the piston of the main hydraulic cylinder.
Figure 12:
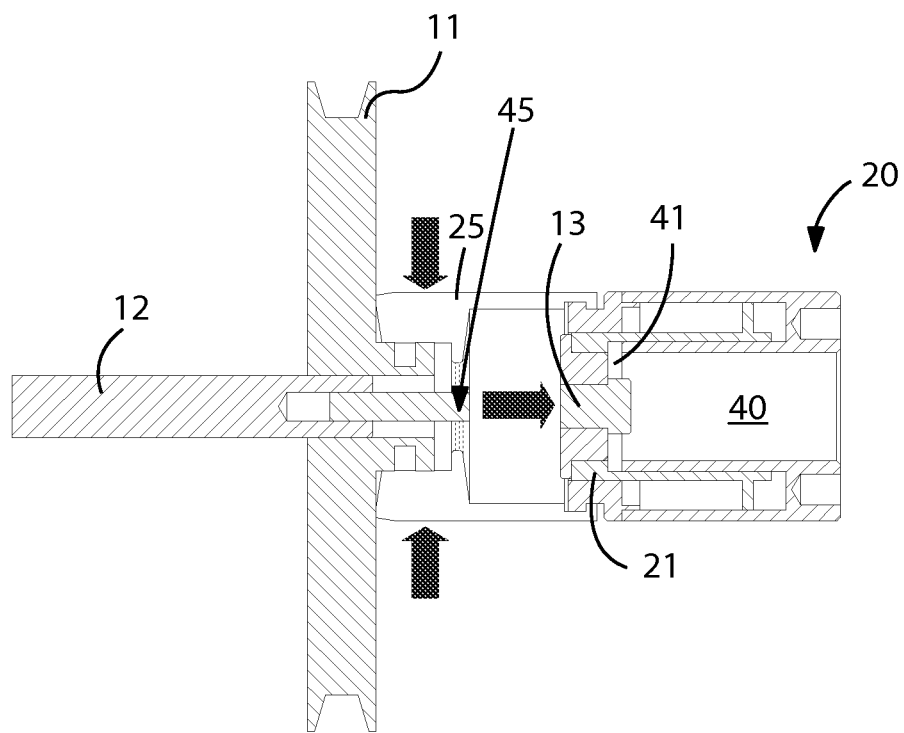
FIG. 12 is a cross-sectional view showing the pulley shaft being pulled out from the pulley via a threaded bolt attached to the piston of the main hydraulic cylinder.
Figure 13:
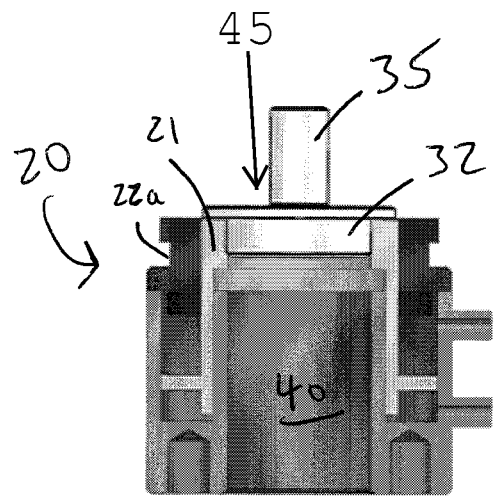
FIG. 13 is a cross-sectional view showing an exemplary embodiment of the main hydraulic cylinder employing an extension insert attached to the piston.
Figure 14:
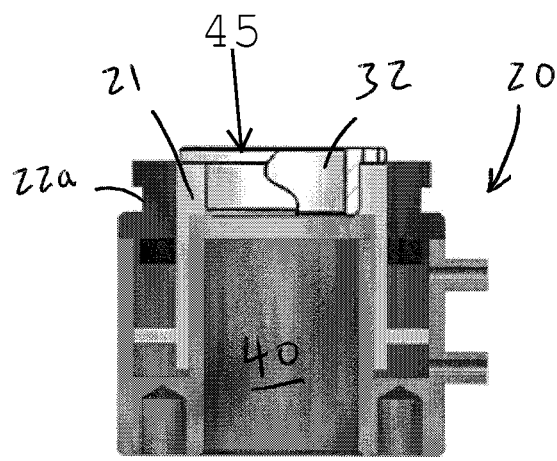
FIG. 14 is a cross-sectional view showing an exemplary embodiment of the main hydraulic cylinder employing an insert attached to the piston without the extension.
Figure 15:
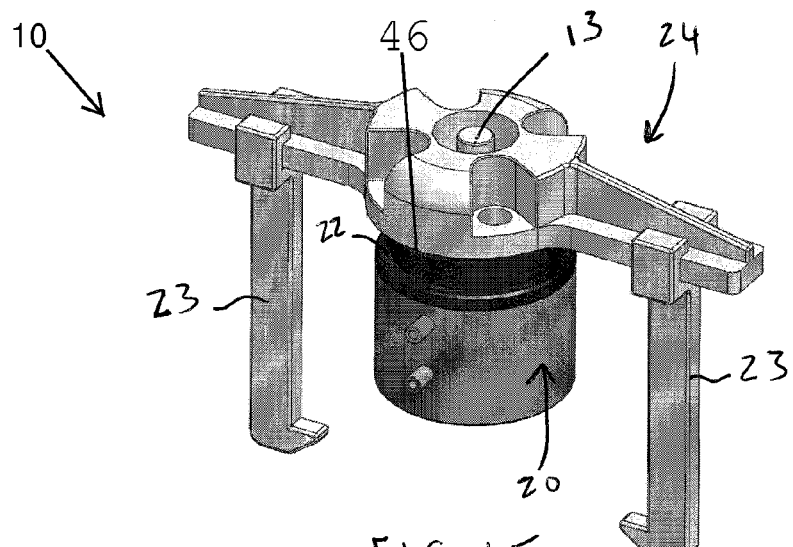
FIG. 15 is a perspective view of an exemplary embodiment wherein a threaded bolt is attached to a proximal end of the main hydraulic cylinder and the gripping holder.
Figure 17:
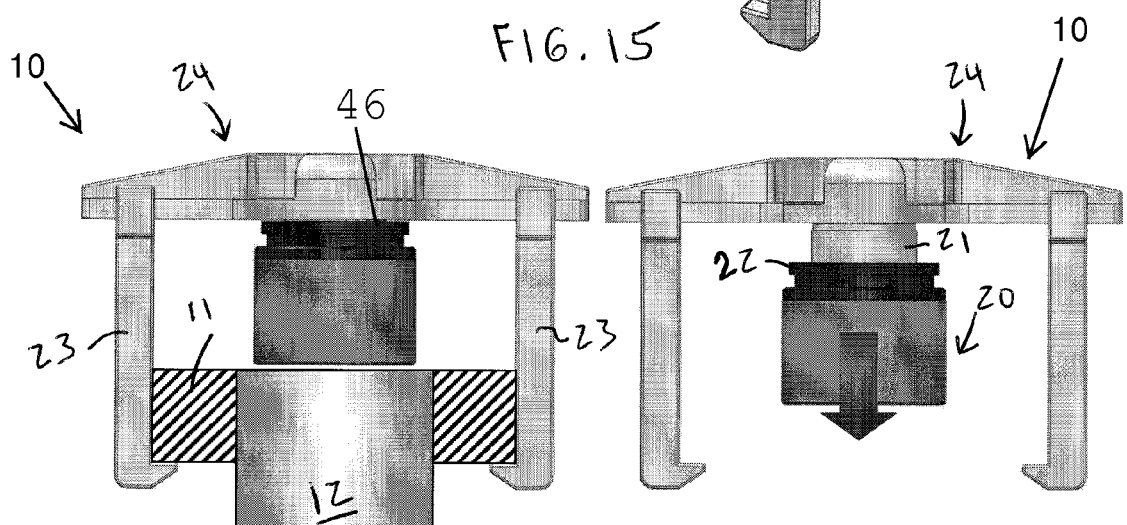
FIGS. 16-17 showing the gripping members of FIG. 15 maintaining the pulley at a stationary position while a distal end of the main hydraulic cylinder pushes the pulley shaft away from the pulley.
Figure 16:
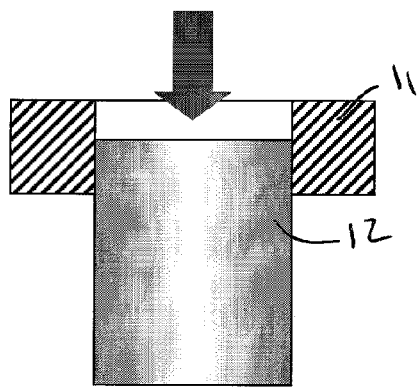

The apparatus of this invention is referred to generally in FIGS. 1-17 and is intended to provide a compact and portable hydraulic extracting and installing apparatus 10. It should be understood that the present invention may be used to extract and install tight fitting components of hydraulic pumps, pulleys and many fluid pressure inducing devices typically in use in a variety of machineries and motor vehicle components, and should not be limited to the uses described herein.

In a non-limiting exemplary embodiment, a compact and portable hydraulic apparatus 10 for extracting and installing a tight fitting vehicle component may include a main hydraulic cylinder 20 having an open proximal end 46, a cover 22 attached to the open proximal end 46 of the main hydraulic cylinder 20, a grip holder 24 attached to the main hydraulic cylinder 20, a plurality of grip members 23 affixed to the grip holder 24 and spaced from the main hydraulic cylinder 20, and an actuating member 45 statically mated to the main hydraulic cylinder 20. In this manner, the actuating member 45 is capable of being engaged with an existing shaft 12 of an existing pulley 11. Advantageously, the actuating member 45 is axially reciprocated through the open proximal end 46 of the main hydraulic cylinder 20, relative to a stationary position of the grip holder 24 and the grip member respectively. Such a structural configuration provides the unexpected and unpredictable advantage of effectively permitting a user to remove the pulley 11 from the shaft 12 (or visa versa) in space-limited work areas without having to manually unscrew the shaft 12 from the pulley 11 (or visa versa).

In a non-limiting exemplary embodiment, the main hydraulic cylinder 20 may include a piston 21 statically engaged with the actuating member 45 and linearly reciprocated along an axial path passing through the proximal open end.

In a non-limiting exemplary embodiment, the grip holder 24 may be statically mated to a distal end 47 of the main hydraulic cylinder 20 such that the cover 22 faces away from the grip holder 24. Such grip members 23 preferably extend substantially parallel to the axial path.

In a non-limiting exemplary embodiment, the grip holder 24 may have an annular ring shape.

In a non-limiting exemplary embodiment, a puller 25 may be removably wrapped about the cover 22 and the open proximal end 46 of the main hydraulic cylinder 20. Such a cover 22 preferably has a groove 22a continuously extending about an entire circumferential perimeter thereof and thereby interfitted within the puller 25. In this manner, the puller 25 is capable of being interlocked with the existing pulley 11.

In a non-limiting exemplary embodiment, the actuating member 45 may be an extension insert 32 statically coupled to the piston 21 and axially reciprocated through the proximal open end.

In a non-limiting exemplary embodiment, the actuating member 45 may be an insert 32 and a bolt 13 attached thereto. Such a bolt 13 may axially passes through the main hydraulic cylinder 20 and exits out from the open proximal end 46 such that the bolt 13 is capable of being mated to the existing pulley 11 shaft 12.

In a non-limiting exemplary embodiment, the grip holder 24 may be statically affixed to the piston 21. Such an actuating member 45 may be an insert 32 and a bolt 13 attached thereto. Such a bolt 13 may be statically affixed to the piston 21 such that the main hydraulic cylinder 20 is axially displaced away from the grip holder 24 while the piston 21 and the grip members 23 remain statically affixed to the grip holder 24 respectively.

The present disclosure may further include a method of utilizing a portable power-actuated apparatus 10 for extracting and installing a tight fitting vehicle component. Such a method may include the steps of: providing a main hydraulic cylinder 20 having an open proximal end 46; providing and attaching a cover 22 to the open proximal end 46 of the main hydraulic cylinder 20; providing and attaching a grip holder 24 to the main hydraulic cylinder 20; providing and affixing a plurality of grip members 23 to the grip holder 24; spacing the grip members 23 from the main hydraulic cylinder 20; providing and statically mating an actuating member 45 to the main hydraulic cylinder 20; engaging the actuating member 45 with an existing shaft 12 of an existing pulley 11; and axially reciprocating the actuating member 45 through the open proximal end 46 of the main hydraulic cylinder 20, relative to a stationary position of the grip holder 24 and the grip member respectively.

In a non-limiting exemplary embodiment, referring to FIGS. 1-17 in general, the compact and portable hydraulic extracting and installing apparatus 10 may include a main hydraulic cylinder 20, a piston 21 and a cover 22, a grip holder 24, grip members 23, a puller 25.

The main hydraulic cylinder 20 may be cylindrical in shape having a cavity 40 as well as a first port 30 and a second port 31 for receiving a displacing agent such as fluid/air thereby retracting or extending the piston 21 respectively. The piston 21 may be in fluid communication with the ports 30, 31 such that hydraulic fluid forces the piston 21 to move linearly along a central axis of the main hydraulic cylinder 20. The piston 21 extends or retracts to provide a pushing or pulling force when the apparatus 10 is connected to a component such as a pulley 11 when a shaft 12 of the pulley 11 has to be extracted or installed, for example. In this way, the hydraulic cylinder 20 and the piston 21 together act as a dual action "actuator" depending on the direction of the hydraulic fluid passing through the first and second ports 30, 31. A plurality of extensions 35 may be added to extend the movement of the piston 21. A plurality of threaded inserts 32 may further be used securely mate the extensions 35 to the piston 21. Alternately, a bolt 13 may be connected to the piston 21 via a threaded insert 32, for example.

The compact and portable hydraulic extracting and installing apparatus 10 offers users a number of significant benefits and advantages. Prior art using a bolt to push or pull the shaft 12 out of the pulley 11, for example, require a strong pair of hands and a significant amount of space and time to turn the bolt. Apart from eliminating the use of excessive force on the pulley 11 or shaft 12, the linear movement of the piston 21 ensures the extraction and installation process is completed without twisting and damaging the pulley 11 or shaft 12 in space-limited work areas.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A portable power-actuated apparatus for extracting and installing a tight fitting vehicle component, said portable power-actuated apparatus comprising:
   a main hydraulic cylinder having an open proximal end;
   a cover attached to said open proximal end of said main hydraulic cylinder;
   a grip holder attached to said main hydraulic cylinder;
   a plurality of grip members affixed to said grip holder and spaced from said main hydraulic cylinder; and
   an actuating member statically mated to said main hydraulic cylinder, said actuating member capable of being engaged with an existing shaft of an existing pulley;
   wherein said actuating member is axially reciprocated through said open proximal end of said main hydraulic cylinder;
   wherein said main hydraulic cylinder comprises: a piston statically engaged with said actuating member and linearly reciprocated along an axial path passing through said proximal open end;
   a puller removably wrapped about said cover and said open proximal end of said main hydraulic cylinder, said cover having a groove continuously extending about an entire circumferential perimeter thereof and being interfitted within said puller;
   wherein said puller is capable of being interlocked with the existing pulley.

2. The portable power-actuated apparatus of claim 1, wherein said grip holder is statically mated to a distal end of said main hydraulic cylinder such that said cover faces away from said grip holder, said grip members extending substantially parallel to said axial path.

3. The portable power-actuated apparatus of claim 1, wherein said actuating member is an extension insert statically coupled to said piston and axially reciprocated through said proximal open end.

4. The portable power-actuated apparatus of claim 1, wherein said actuating member is an insert and a bolt attached thereto, said bolt axially passing through said main hydraulic cylinder and exiting out from said open proximal end, wherein said bolt is capable of being mated to the existing pulley shaft.

5. The portable power-actuated apparatus of claim 1, wherein said grip holder is statically affixed to said piston, said actuating member being an insert and a bolt attached thereto, said bolt being statically affixed to said piston such that said main hydraulic cylinder is axially displaced away from said grip holder while said piston and said grip members remain statically affixed to said grip holder.

6. A portable power-actuated apparatus for extracting and installing a tight fitting vehicle component, said portable power-actuated apparatus comprising:
   a main hydraulic cylinder having an open proximal end;
   a cover attached to said open proximal end of said main hydraulic cylinder;
   a grip holder attached to said main hydraulic cylinder;
   a plurality of grip members affixed to said grip holder and spaced from said main hydraulic cylinder; and
   an actuating member statically mated to said main hydraulic cylinder, said actuating member capable of being engaged with an existing shaft of an existing pulley;
   wherein said actuating member is axially reciprocated through said open proximal end of said main hydraulic cylinder, relative to a stationary position of said grip holder and said grip members respectively;
   wherein said main hydraulic cylinder comprises: a piston statically engaged with said actuating member and linearly reciprocated along an axial path passing through said proximal open end;
   wherein said grip holder is statically affixed to said piston, said actuating member being an insert and a bolt attached thereto, said bolt being statically affixed to said piston such that said main hydraulic cylinder is axially displaced away from said grip holder while said piston and said grip members remain statically affixed to said grip holder.

7. The portable power-actuated apparatus of claim 6, wherein said grip holder is statically mated to a distal end of said main hydraulic cylinder such that said cover faces away from said grip holder, said grip members extending substantially parallel to said axial path.

8. The portable power-actuated apparatus of claim 6, further comprising: a puller removably wrapped about said cover and said open proximal end of said main hydraulic cylinder, said cover having a groove continuously extending about an entire circumferential perimeter thereof and being interfitted within said puller;
   wherein said puller is capable of being interlocked with the existing pulley.

* * * * *